US011853369B2

(12) United States Patent
Hamlin et al.

(10) Patent No.: US 11,853,369 B2
(45) Date of Patent: Dec. 26, 2023

(54) AUTOMATIC REVISIONS TO DOCUMENT CLAUSES BASED ON CLAUSE TYPE

(71) Applicant: DocuSign, Inc., San Francisco, CA (US)

(72) Inventors: Christina Silva Hamlin, Walnut Creek, CA (US); Eric M. Zenz, Mercer Island, WA (US); Jacob Scott Mitchell, Richmond, VA (US); William Gerard Wetherell, San Francisco, CA (US); Sedine Jei San Agustin, Walnut Creek, CA (US); Aylin Selcukoglu, Chicago, IL (US); Megan Elizabeth Schwarz, Chicago, IL (US); David Minoru Hirotsu, Torrance, CA (US); Dia A. Abulzahab, Willowbrook, IL (US); Mangesh Prabhakar Bhandarkar, Los Altos, CA (US); Isaac John Steiner, Chicago, IL (US); Saul Adams Aguilar, Redwood City, CA (US); Michael Wayne Fountain, Bainbridge Island, WA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 17/514,369

(22) Filed: Oct. 29, 2021

(65) Prior Publication Data
US 2023/0135318 A1 May 4, 2023

(51) Int. Cl.
*G06F 16/93* (2019.01)
*G06N 20/00* (2019.01)

(52) U.S. Cl.
CPC .............. *G06F 16/93* (2019.01); *G06N 20/00* (2019.01)

(58) Field of Classification Search
CPC .... G06F 16/178; G06F 16/27; G06F 16/1873; G06F 16/219; G06F 40/279; G06F 40/205; G06F 40/194; G06F 40/197; G06F 40/30; G06F 40/166; G06F 16/93
See application file for complete search history.

(56) References Cited

U.S. PATENT DOCUMENTS

2009/0043824 A1* 2/2009 Claghorn ................ G06F 16/93
2018/0253409 A1* 9/2018 Carlson ................. G06F 40/205

* cited by examiner

*Primary Examiner* — Hau H Hoang
(74) *Attorney, Agent, or Firm* — KDW FIRM PLLC

(57) ABSTRACT

A document management system can include an artificial intelligence-based document manager that can perform one or more predictive operations based on characteristics of a user, a document, a user account, or historical document activity. For instance, the document management system can apply a machine-learning model to determine how long an expiring agreement document is likely to take to renegotiate and can prompt a user to begin the renegotiation process in advance. The document management system can detect a change to language in a particular clause type and can prompt a user to update other documents that include the clause type to include the change. The document management system can determine a type of a document being worked on and can identify one or more actions that a corresponding user may want to take using a machine-learning model trained on similar documents and similar users.

17 Claims, 10 Drawing Sheets

Document Editing Dashboard

Contract1.docx

The Service Contract ("Contract") is entered into as of the Effective Date by and between ABC, Inc. ("ABC") and XYZ, Co. ("Client"), having an address of 1234 2nd Street (together, "Parties") and sets forth the agreement between the Parties related to the following terms as defined in this Contract.

Section 1.1. Term of Contract.

The Term shall commence on June 15, 2021 and shall remain in effect for three (3) years. The Term shall also continue for additional one (1) year renewal periods unless notice of non-renewal is provided by either party at least sixty (60) days before the end of the then current three (3) year period of the Term, in which case this Contract shall expire as of the last day of such period.

Section 2.1. Transaction Fees.

1. Commencing on June 15, 2021, Client shall pay a rate of $1.75 for all Authorized transactions and $0.70 for all Check transactions with the sole exception of transactions processed by Client on behalf of Main Street Higher Education Corp. ("Main Street").

Actions
- Populate Fields
- Toggle Document Tense
- Replace with Clause ▷
- Replace Text with Field

FIG. 9

AUTOMATIC REVISIONS TO DOCUMENT CLAUSES BASED ON CLAUSE TYPE

TECHNICAL FIELD

The disclosure generally relates to the field of document management, and specifically to predicting actions a user may want to take with regards to documents.

BACKGROUND

Online document management systems can be used to provide, create, and review documents. Conventional document analysis environments may provide users with tools to view individual documents but lack functionality that makes sufficient use of metadata associated with the documents to improve user interactions with the documents. To keep a collection of documents up to date, a user must keep track of upcoming deadlines associated with agreements in various documents, remember to update similar clause language across a portfolio of related documents, and manually perform additional actions related to editing and reviewing documents. To provide an improved, efficient, and more reliable document interactions experience to the user, there is a need for a system that assists a user with document upkeep, analysis, and review.

SUMMARY

To help a user keep track of deadlines and expiration dates related to documents, a document management system identifies upcoming expiring agreements and uses machine learning models to predict how long it will take the user to renegotiate the agreement with a counterparty to the agreement. In this way, the document management system can prompt the user to begin the renegotiation process at least a predicted interval of time ahead of the expiration date. The system identifies an expiration date associated with each document in a set of documents that are associated with the user. The document management system can then apply machine learning models to each of the documents to determine, for those documents with expiration dates, how long it is likely to take the user to re-negotiate the agreement with a counterparty. Working backward from the expiration date of the document and leaving at least the predicted amount of time for a re-negotiation, the document management system notifies the user of the upcoming expiration date of the agreement and of the predicted time for re-negotiation. The user can submit a request for the document management system to begin preparing the documents for the re-negotiation process.

The document management system also helps users to keep clause language consistent across multiple documents. As a user edits language of one document, the document management system can provide a list of other documents associated with the user that have the same or similar clause language and may give the user the option to automatically update the language to match the edits made to the first document. The document management system identifies that a user has made an edit to a clause of a first document and queries a database to find a set of documents associated with the user that have the same clause in its or near to original form. The document management system then updates a user interface to notify the user of the related documents with similar clauses and the user can provide feedback via the interface to request that the similar clauses in one or more of the identified documents be updated to match the edited clause of the first document.

The document management system also makes it easier for a user to access and request actions with respect to individual documents. Machine learning models are trained to identify a document type when given a document or a set of document features. The document management system applies the models to a document that a user is editing or reviewing. Based on the document type predicted by the model and the document contents, the document management system identifies a set of actions that can be taken on the document. The set of actions is presented to the user in a user interface and the user can easily request that one or more of the actions be taken by the document management system to update the document automatically.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a document management system, in accordance with an example embodiment.

FIG. 9 illustrates an interface of a document editing dashboard for viewing and selecting suggested actions related to a document, in accordance with an example embodiment.

DETAILED DESCRIPTION

Figure 1:
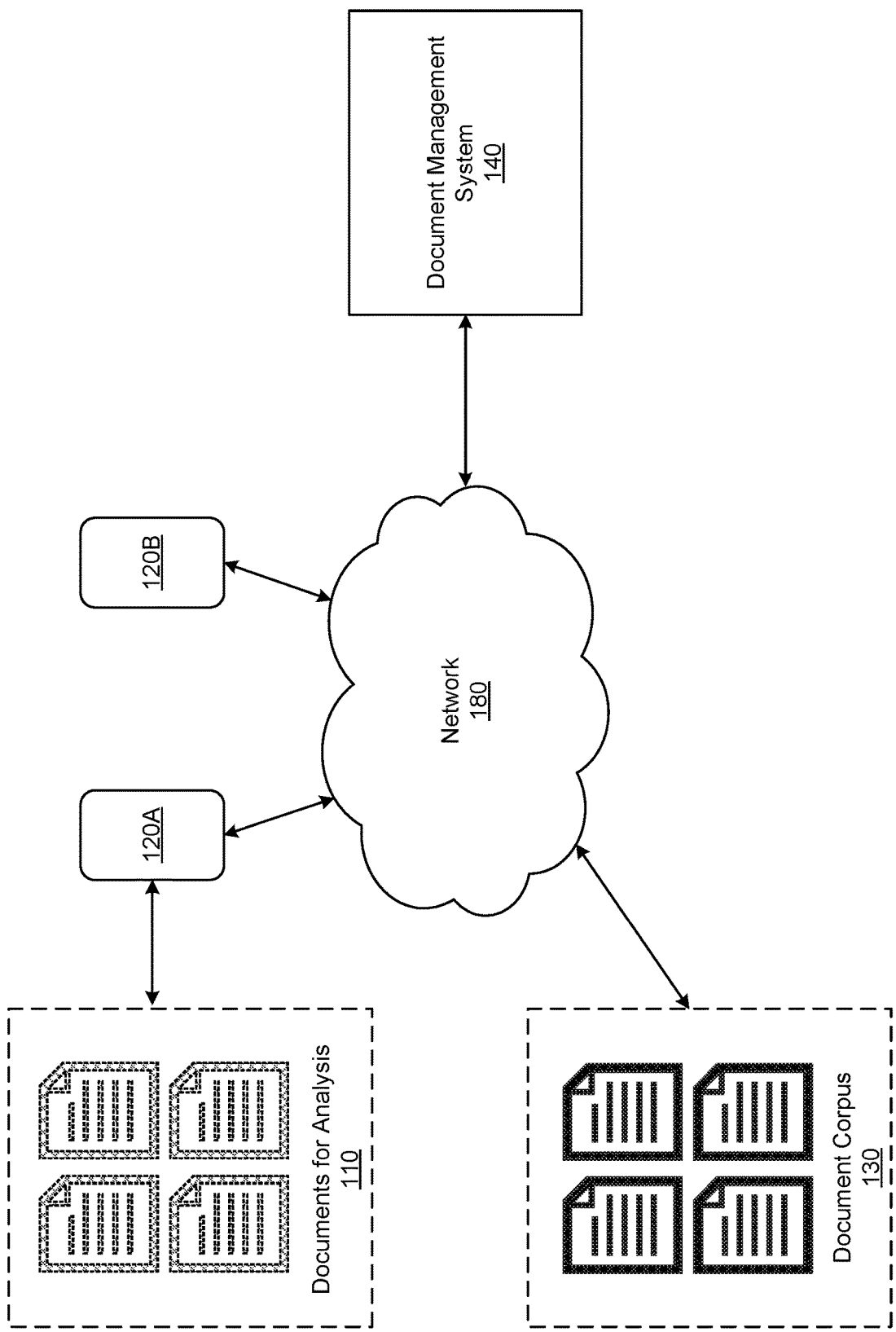

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Overview

A document management system can assist users in identifying upcoming expiring agreements. This can be helpful for example if a client has multiple agreements that will require renewal negotiations in the near future. The document management system uses a trained negotiation prediction model to predict how long it is likely to take for agreements to be re-negotiated. Based on the prediction, the document management system may prompt a user of a client device to begin the renegotiation process at least a predicted interval of time ahead of the expiration date of the agreement. Although examples herein describe agreement re-negotiations, this process may be used in other situations, such as for documents with associated filing deadlines, or for documents which are regularly generated and updated or that are time-sensitive, such as monthly calendars, and bi-monthly supply request forms.

The document management system also monitors standard clauses included by a user in documents and, when a clause is updated, flags other documents that include the same clause for updating. In this way, a user can be notified of other documents that the user may also want to update to include the language of the updated clause. If the difference between the instance of each clause in a flagged document and the updated clause language exceeds a threshold value, the documents may be presented to the user within an interface that enables the user to automate the process of updating the language of the outdated clause instances in the documents.

The document management system additionally uses machine learning models to identify a type of document with which a user is interacting and to suggest actions that can be taken on the document. Examples of actions that may be taken with respect to a document include replacing text with fields, replacing clauses with pre-approved versions of the clauses, and synchronizing the document with a third-party system. Action options may be based on actions taken by similar users, actions done to similar documents, and actions taken in similar contexts (e.g., at similar times of the year). In one embodiment, the document management system presents the recommended actions within an interface that enables a user to view and select desired actions from a list of suggested actions and that enables the user to automate the performance of the actions if requested System Environment The system environment described herein can be implemented within an online document system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

FIG. 1 is a high-level block diagram of a system environment for a document management system, in accordance with an example embodiment. The system environment enables client systems associated with a document management system 140 to create and manage digital documents, e.g., for electronic execution to one or more receiving parties. A client may review, modify, and execute generated documents. As illustrated in FIG. 1, the system environment includes documents for analysis 110, one or more client devices 120 (e.g., client device 120A and client device 120B), a document corpus 130, and a document management system 140, each communicatively interconnected via a network 180. In some embodiments, the system environment includes components other than those described herein. For clarity, although two client devices 120 are shown in FIG. 1, alternate embodiments of the system environment can have any number of client devices 120. For the purposes of concision, the web servers, data centers, and other components associated with an online system environment are not shown in FIG. 1.

The documents for analysis 110 are analyzed to identify upcoming expiration dates of stored documents for renegotiation purposes, to identify changes to clause language and portions of other documents with similar clause language that may need to be updated, and to identify document types for action recommendations based on actions taken with respect to similar documents and/or similar users. Examples of documents for analysis 110 include but are not limited to: a sales contract, a permission slip, a rental or lease agreement, a liability waiver, a financial document, an investment term sheet, a purchase order, an employment agreement, a mortgage application, and so on. Each document for analysis 110 can include one or more clauses. Clauses are portions of a document, and may include text, images, or other material of any length. In some embodiments, a clause corresponds to a legal clause, a business clause, financial agreement text, and the like. A given document in the documents for analysis 110 may include multiple clauses that each correspond to a different header within the document. Clauses may further be associated with one or more clause types that characterize content of the clause as corresponding to a particular category of the clause. Examples of clause types include but are not limited to an indemnity clause, a merger and integration clause, a severability clause, a fees clause, a damages clause, a pricing clause, a purchase clause, a payment clause, and so on. It should be noted that not every portion of a document or of text within a document may be considered a "clause" for the purposes of the description here.

A client device 120, such as client device 120A, provides the set of documents for analysis 110 to the document management system 140 (or provides instructions to create documents with information from the client device 120). Although examples are given herein in the context of a set of documents for analysis 110, the document management system 140 can coordinate the creation, viewing, editing, analyzing, and signing of any number of documents (e.g., thousands, millions, and more) for any number of users or accounts, and for any number of entities or organizations. The client device 120 is a computing device capable of transmitting or receiving data over the network 180. The client device 120 may be a conventional computer (e.g., a laptop or a desktop computer), a server, a cell phone, or a similar device. The client device 120 enables a user to create a set of documents for analysis 110 and to provide the set of documents for analysis 110 to the document management system 140. After the document management system 140 analyzes or otherwise makes use of the set of documents for analysis 110, the client device 120 may provide information to a user of the client device 120 describing any results related to the analysis (e.g., via display of a user interface). In some embodiments, the client device 120 receives an interface for display from the document management system 140.

The document corpus 130 includes document information for the document management system 140. The document corpus 130 may include a set of training documents (e.g., for use by the document management system 140 in training machine learning models). Documents in the document corpus 130 may be stored in association with document metadata. Document metadata may include training labels for training certain machine learning models and may additionally include various information describing documents or clauses of documents (e.g., clause metadata), such as user-provided classifications for clauses. In some embodiments, the document management system 140 may analyze or otherwise interpret the set of documents for analysis 110 in isolation or with reference to a particular subset of documents of the document corpus 130. The document corpus 130 may include documents provided by one or more parties, such as a party associated with the client device 120. In various embodiments, the document corpus 130 may be stored locally on the document management system 140 or may be stored remotely from the document management system 140 (as shown in FIG. 1).

The document management system 140 is a computer system (or group of computer systems) for storing and managing documents for various entities. The document management system 140 receives information from components of the system environment including the documents for analysis 110 and the document corpus 130. The document management system 140 uses this information to determine information related to the documents for analysis, such as deadlines associated with upcoming agreement re-negotiations, updates to clauses in similar documents, and predictions of certain actions that a client may want to take with respect to a document. In some cases, the document management system 140 may coordinate a collaboration process between a party and a counterparty, for example, between clients associated with client device 120A and clients associated with client device 120B.

The document management system 140 can be a server, server group or cluster (including remote servers), or another suitable computing device or system of devices. In some implementations, the document management system 140 can communicate with user devices (e.g., the client device 120) over the network 180 to receive and provide information (e.g., documents or document analyses).

The network 180 transmits data within the system environment. The network 180 may be a local area or wide area network using wireless or wired communication systems, such as the Internet. In some embodiments, the network 180 transmits data over a single connection (e.g., a data component of a cellular signal, or Wi-Fi, among others), or over multiple connections. The network 180 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
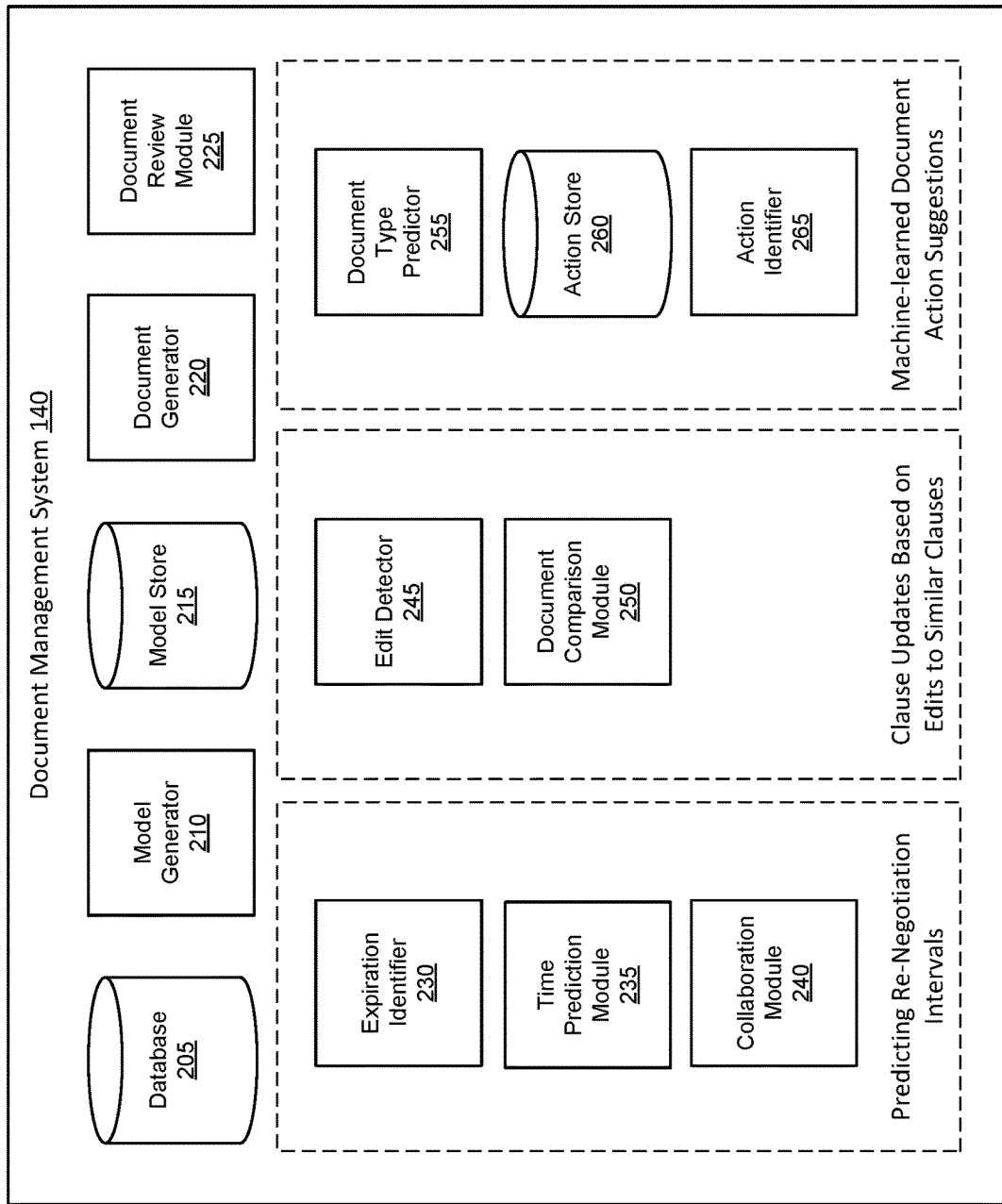
FIG. 2 is a high-level block diagram of a system architecture of a document management system, in accordance with an example embodiment.

FIG. 2 is a high-level block diagram of a system architecture of a document management system, in accordance with an example embodiment. The document management system 140 includes various modules and data stores to determine upcoming agreement re-negotiation deadlines, suggest clause updates to related or similar documents, and to suggest actions a client may want to take with respect to a document. The document management system 140 includes a database 205, a model generator 210, a model store 215, a document generator 220, a document review module 225, an expiration identifier, a time prediction module 235, a collaboration module 240, an edit detector 245, a document comparison module 250, a document type predictor 255, an action store 260, and an action identifier 265. In FIG. 2, the modules have been grouped according to system processes that they support for clarity. The expiration identifier 230, the time prediction module 235, and the collaboration module 240 are all used by the document management system 140 for predicting re-negotiation intervals. The edit detector 245 and the document comparison module 250 are used by the document management system 140 for updating similar clauses across documents. The document type predictor 255, the action store 260, and the action identifier 265 are all used by the document management system 140 for suggesting document actions to a client. Computer components such as web servers, network interfaces, security functions, load balancers, failover servers, management and network operations consoles, and the like may not be shown so as to not obscure the details of the system architecture. Additionally, the document management system 140 may contain more, fewer, or different components than those shown in FIG. 2 and the functionality of the components as described herein may be distributed differently from the description herein.

The database 205 stores information relevant to the document management system 140. The stored data may include, but is not limited to, the set of documents for analysis 110, clauses within the set of documents for analysis 110, the document corpus 130, clusters of document clauses, and so on. In some embodiments, the database 205 stores metadata information associated with documents or clauses, such as documents labeled with training data for machine learning models. The document management system 140 can update information stored in database 205 as new information is received, such as new documents for analysis, results of analyses performed by the expiration identifier 225, the edit detector 230, the time prediction module 235, the document type predictor 240, and the document comparison module 245. The document management system 140 can also update information stored in the database 205 based on user input provided via user interfaces as may be generated by the document review module 260.

The model generator 210 trains machine learning models that are used by various modules of the document management system 140. In various embodiments, the model generator 210 may use different versions of supervised or unsupervised training, or another training technique to generate and update the models. The models may be any appropriate machine learning model, including, but not limited to, decision trees, regression algorithms, support vector machines, and neural networks. Two models that may be generated and maintained by the model generator 210 include a negotiation prediction model 325 and a document type prediction model 825. Additional details about these specific models are provided in reference to FIG. 3 and FIG. 8. To train the models, the model generator 210 may access training data, such as labeled documents stored in the database 205. For example, training data for models may come from the document corpus 130. The model generator 210 trains the models using the training data and stores trained machine learning models in the model store 215. In some embodiments, the model generator retrains the models stored in the model store 215 periodically, or as new training data is received.

The model store 215 stores machine learning models for the document management system 140. In some embodiments, the model store 215 may store various versions of models as they are updated over time. In the example herein, the model store 215 stores a negotiation prediction model 325 and a document type prediction model 825. In some cases, the model store 215 may store multiple versions of a type of model, for example, to apply to different document types or to other variations of available inputs.

The document generator 220 manages generation and modification of documents. In some cases, a document may be generated at a client device 120 and then sent to the document management system 140 for storage or analysis. In some cases, a document may originate at the document generator 220. The document generator can open new documents for viewing, editing, or other document interactions. Documents may be started based on templates stored in the database 205 or based on prior documents stored in the database 205. In some embodiments, blank documents are also generated when needed. In addition to generating new documents, the document generator 220 facilitates document edits and updates. Documents may be edited in various ways. In one embodiment, updated documents are received from a client device 120, and may be saved to the database 205 by the document generator 220 as a new version of the document. In another embodiment, a user of a client device 120 can access an interface of the document management system 140 and can make edits to a document via the interface. The document generator saves changes to the database 205. In some cases, the document generator 220 can also edit documents without direct input from a client device 120, such as by making updates to documents based on client instructions to update similar clauses across all documents, or such as by performing a scheduled document edit. In some embodiments, the document generator 220 also manages document deletion.

The document review module 225 facilitates human review of documents and document information. In various embodiments, the document review module 160 provides one or more user interfaces to client systems associated with the document management system 140 for reviewing documents and analysis of documents. For example, the document review module 225 may transmit user interfaces for rendering by a client device 120 to present a document or information about documents to a user of the client device 120. Document information presented in the user interfaces may include document metadata, predictions about negotiations associated with a document, or actions that a user may want to take with respect to a document. The document review module 225 may further use user input received via the provided user interfaces to make changes to one or more documents stored in the document store 205. Examples of user interfaces that may be provided by the document review module 160 are described in greater detail below with reference to FIG. 5, FIG. 7, and FIG. 9.

Predicting Re-Negotiation Intervals

The document management system 140 can assist users in identifying upcoming expiring agreements. This can be helpful for example if a client has multiple agreements that will require renewal negotiations in the near future. An agreement document can include one or more of a contract, an employment agreement, a purchase agreement, a services agreement, or a financial agreement. The document management system 140 uses a trained negotiation prediction model to predict how long it is likely to take for agreements to be re-negotiated. Based on the prediction, the document management system 140 may prompt a user of a client device 120 to begin the renegotiation process at least a predicted interval of time ahead of the expiration date of the agreement. Although examples herein describe agreement re-negotiations, this process may be used in other situations, such as for documents with associated filing deadlines, or for documents which are regularly generated and updated or that are time-sensitive, such as monthly calendars, or bi-monthly supply request forms. Referring back to FIG. 2, a system for predicting re-negotiation intervals includes the expiration identifier 230, the time prediction module 235, and the collaboration module 240.

The expiration identifier 230 tracks information about documents with expiration dates. Documents stored in the database 205 can be stored in association with metadata that indicates expiration dates. In one embodiment, an expiration date associated with an agreement document is a date after which the terms of the agreement document are no longer valid. For example, a document that represents an agreement between a party and a counterparty may include a date after which the agreement will no longer be in force. In some embodiments, an expiration date may be explicitly indicated in the document metadata when the document is saved to the database 205. In alternate embodiments, the expiration identifier 230 may use a trained machine learning model or another technique to identify expiration dates associated with documents. In one embodiment, the expiration identifier determines that all documents that have a likelihood of being associated with an expiration date have associated expiration date metadata stored. For example, the expiration identifier 230 in some cases may detect an agreement document without expiration date metadata and may request additional information about whether the document has an expiration date from a user of the client device associated with the document. In some embodiments, the expiration identifier may periodically review the dates associated with stored documents and may flag the documents as having upcoming expiration dates.

The time prediction module 235 applies trained machine learning models to predict negotiation times for documents with expiration dates. In one embodiment, the time prediction module 235 uses a negotiation prediction model 325, which takes an agreement document as input and outputs a predicted amount of time that it will take for the agreement to be re-negotiated. Additional information about the training and application of the negotiation prediction model 325 is included in reference to FIG. 3 below. The prediction produced by the time prediction module 235 may be stored in the database 205 as metadata associated with the agreement document. In some cases, the time prediction module 235 may analyze a document upon receipt of the document at the document management system 140. In some embodiments, the time prediction module 235 may update time predictions for documents periodically, or as additional training data is received to update the negotiation prediction model 325. The document review module 225 can provide a notification of upcoming document expiration to a user at a client device 120. Using the information about the predicted amount of time that an agreement re-negotiation will take for an agreement document, the document review module 225 can provide the notifications about upcoming document expirations such that a user of the client device 120 has enough time ahead of the expiration date to re-negotiate the agreement before it expires.

The collaboration module 240 facilitates a collaboration process between a first party associated with an agreement document and one or more counterparties to the agreement. In various embodiments, the collaboration module 240 works in conjunction with the document generator 220 and the document review module 225 to generate a new agreement document for updating and re-negotiating the agreement and to send notifications and interfaces to the client devices 120 associated with the parties and counterparties. The collaboration module 240 may track the progress of the re-negotiation of the agreement and may modify accounts of a user and any counterparties to enable access by the users and counterparties to updated agreement documents. For example, the client device 120B, shown in FIG. 1 may be a client device associated with a counterparty to an agreement in a document owned by the client associated with client device 120A. When the collaboration module 240 begins the re-negotiation process, the document generator 220 may produce a new agreement document for review by the client at client device 120A. When the document is ready, the document review module 225 may send a notification to the counterparty at client device 120B to request a review of the document and any additional information or signatures. In some cases, the collaboration module 240 may keep track of what additional information is needed to complete an agreement renegotiation by the expiration deadline. When an agreement re-negotiation is completed by the parties and counterparties, the collaboration module 240 stores the new agreement documents and associated expiration dates in the database 205.

Figure 3:
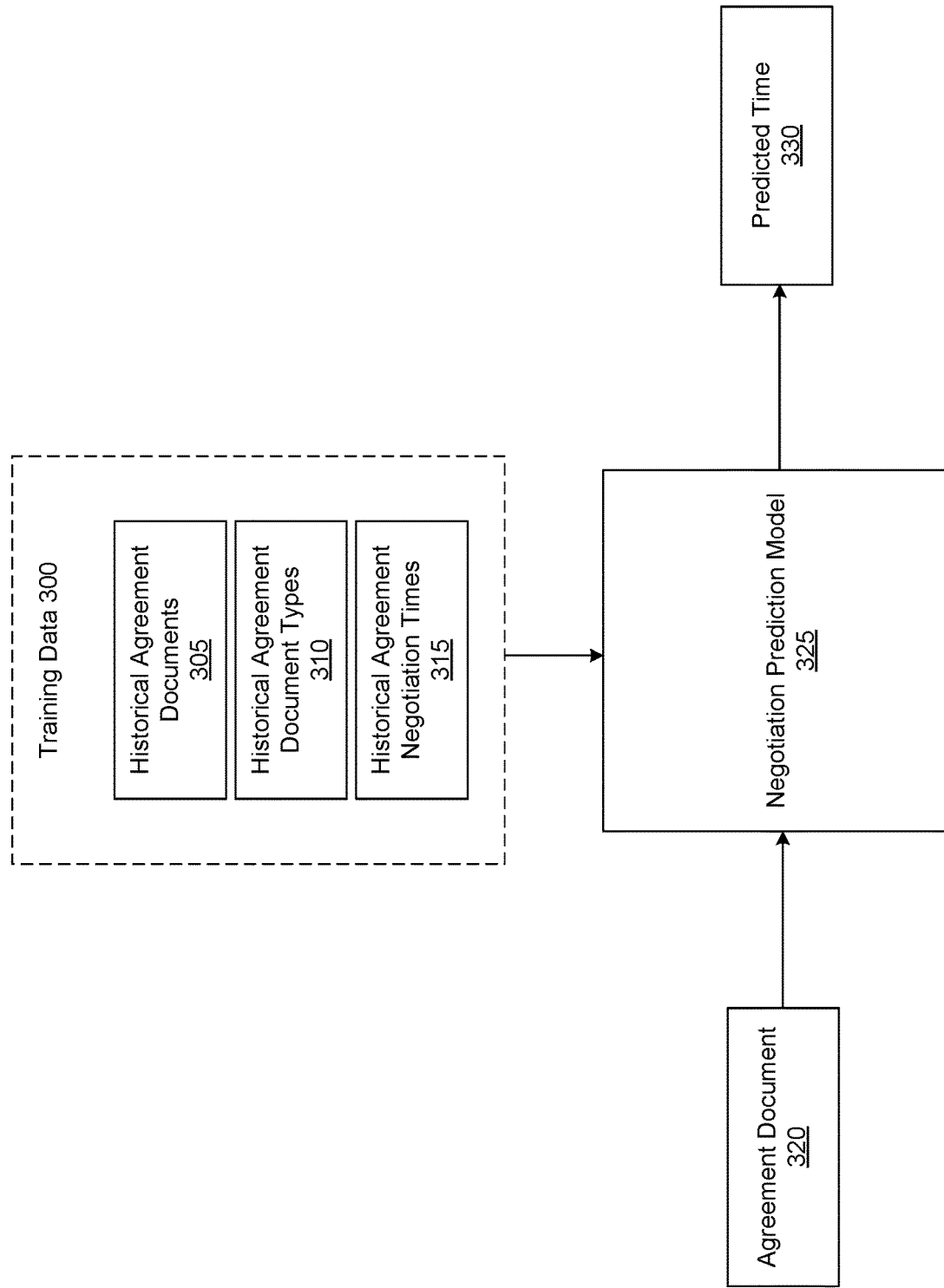
FIG. 3 is a flow diagram illustrating training and application processes for a negotiation prediction model 325, in accordance with an example embodiment.

FIG. 3 is a flow diagram illustrating training and application processes for a negotiation prediction model 325, in accordance with an example embodiment. The negotiation prediction model 325 takes, as input, metadata and other information related to a document to determine a predicted time it will take to negotiate an agreement document. The negotiation prediction model 325 is trained to predict how long a negotiation of an agreement is likely to take based on historical information about the parties involved in the agreement, the type of agreement, and the contents of the document.

The model generator 210 trains the negotiation prediction model 325 using a set of training data 300. In one embodiment, the model generator 210 accesses a set of historical agreement documents used for training, determines how long each of the historical agreement documents took to negotiate, and trains the negotiation prediction model 325 to correlate a length of negotiation for each historical agreement document with a type of each historical agreement document. The training data 300 includes historical agreement documents 305 (i.e., past agreement documents that have been processed by the document management system 140 and associated metadata), historical agreement document types 310 (e.g., sales contract, indemnity agreement, equipment lease, employment agreement, non-disclosure agreement, etc.), and historical agreement negotiation times 315 (e.g., one week, two months, twenty days, etc.). In various embodiments, the training data may include additional or different training inputs, not shown in FIG. 3. For example, additional training data 300 may include context information about when an agreement was decided and information about the parties involved in past agreements.

The historical agreement documents 305, historical agreement document types 310, and historical agreement negotiation times 315 may be provided via client devices 120 to the document management system 140. In other embodiments, the document management system 140 may automatically collect the historical agreement document 305, the historical agreement document types 310, and the historical agreement negotiation times 315 to add to the training data 300. In other embodiments, a user of a client device 120 associated with the document management system 140 (e.g., a system administrator) may manually input or curate a subset of the training data 300. It should be noted that although FIG. 3 shows a use of historical documents and historical document information, the training data 300 may also include sample documents generated and labeled for the purpose of training the negotiation prediction model 325 in addition to historical document data.

Historical agreement documents 305 used as a subset of the training data 300 may include the text of historical documents and metadata associated with the documents. Historical agreement documents 305 may include documents associated with the user of the client device 120, documents associated with an entity or with another user associated with the user of the client device 120, and historical agreement documents may include documents associated with users having one or more characteristics in common with the user. In addition to the text and input fields in a document, the metadata stored in association with the historical agreement documents 305 may include document file type, file size, languages within the document, region in which the document originated, characteristics associated with the sending and receiving party of the document (e.g., size, industry, location of headquarters, revenue, corporate structure), types or categories of information or passages within the document, and the like.

The historical agreement document types 310 include annotations of the historical agreement document 305 that indicate the type of agreement or negotiation that the document represents. An agreement document type may include any document with an agreement negotiated between at least two parties, such as a sales contract, a permission slip, a rental or lease agreement, a liability waiver, a financial document, an investment term sheet, a purchase order, an employment agreement, a mortgage application, an indemnity agreement, an equipment lease, and a non-disclosure agreement.

The historical agreement negotiation times 315 include annotations of the historical agreement documents 305 that indicate the length of time it took for the agreement represented by the document to be reached. In some cases, the training information about the historical agreement negotiation times may be input manually by a user of a client device 120 associated with the document or by a system administrator. In some cases, the document management system 140 may detect an amount of time it took for an agreement to be negotiated (e.g., the time between document creation and execution of the document by all parties).

The model generator 210 uses supervised or unsupervised machine learning to train the negotiation prediction models 325 using the training data 300. Different machine learning techniques may be used in various embodiments, such as linear support vector machines (linear SVM), boosting for other algorithms (e.g., AdaBoost), neural networks, logistic regression, naive Bayes, memory-based learning, random forests, bagged trees, decision trees, boosted trees, or boosted stumps. The training of the negotiation prediction model 325 helps the model to identify relationships between the historical agreement documents 305, the historical agreement document types 310, and the historical negotiation times 315. In other words, training a negotiation prediction model 325 enables the negotiation prediction model 325 to identify a predicted time 330 that it will take for an agreement to be re-negotiated, given the original agreement document 320 and history of similar agreement documents. In some embodiments, the model generator 210 trains multiple negotiation prediction models 325, such as a separate negotiation prediction model 325 for each agreement type.

A trained negotiation prediction model 325 can be applied by the time prediction module 235 to an agreement document 320. In some embodiments, the negotiation prediction model 325 also accepts metadata associated with the document (e.g., document agreement type, agreement parties) as input. The negotiation prediction model 325 generates a predicted time 330 that it will take for the agreement in the current agreement document to be renegotiated. The document review module 225 may display the agreement expiration date from the expiration identifier 230 and the predicted time 330 for re-negotiation of the agreement for a client associated with the document to view in an interface at the client device 120.

Figure 4:
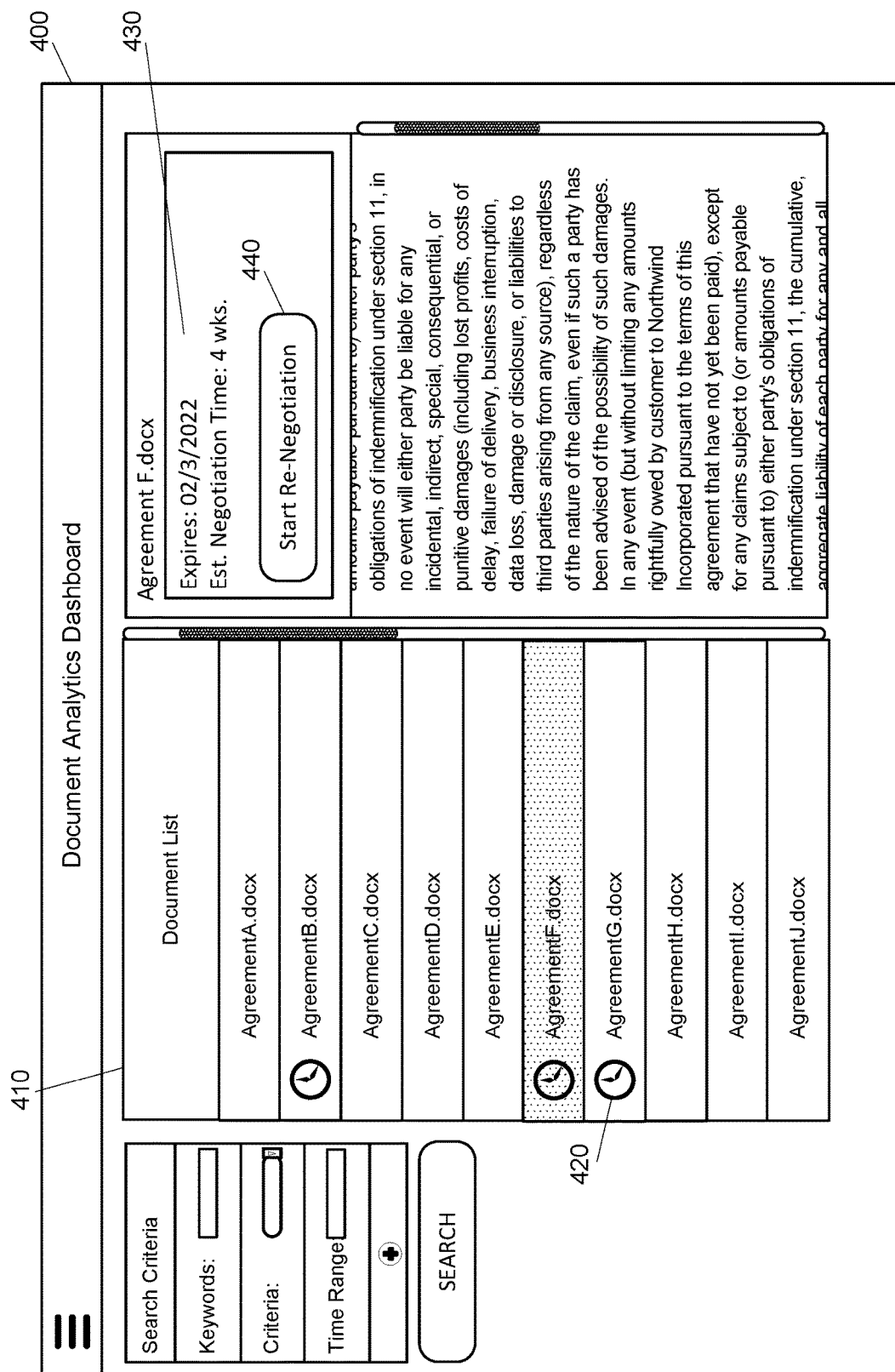
FIG. 4 illustrates an interface 400 of a document analytics dashboard for reviewing upcoming expiration dates of agreement documents, in accordance with an example embodiment.

FIG. 4 illustrates an interface 400 of a document analytics dashboard for reviewing upcoming expiration dates of agreement documents, in accordance with an example embodiment. In the embodiment shown, the interface 400 includes a document list 410, notification icons 420, an agreement status interface 430, and a re-negotiation widget 440. The example interface 400 shows a document list 410 of agreement documents. In the example of FIG. 4, a user may also search for specific documents in the list using a search interface. The document list includes notification icons 420 next to agreements with identified expiration dates that are sooner than a threshold length of time from the present date. For example, AgreementB.docx, AgreementF.docx, and AgreementG.docx have notification icons 420 indicating impeding expiration dates. The interface 400 also includes an agreement status interface 430 that displays additional details about the expiration dates of agreement documents in the document list 410. In the example of FIG. 4, AgreementF.docx is selected by the user, as indicated by the dotted fill in the document list 410. The agreement status interface 430 displays an expiration date of the document to be Feb. 3, 2022, as identified by the expiration identifier 230. The agreement status interface 430 also displays an estimated time for negotiating a new agreement to be four weeks, as generated by the time prediction module 235. In the example of FIG. 4, the interface 400 also displays a document preview so that a user can view the selected document. The re-negotiation widget 440 may be a button or other interface configuration for confirming a selection. The user can select the re-negotiation widget 440 to confirm a request to generate an updated version of the agreement document and to initiate a document collaboration process between the user and a counterparty to the agreement, as may be managed by the collaboration module 240. Initiating the document collaboration process may include modifying accounts of the user and the counterparty to enable access to the updated agreement document. The components and functionalities of an interface 400 may be different in different embodiments.

Figure 5:
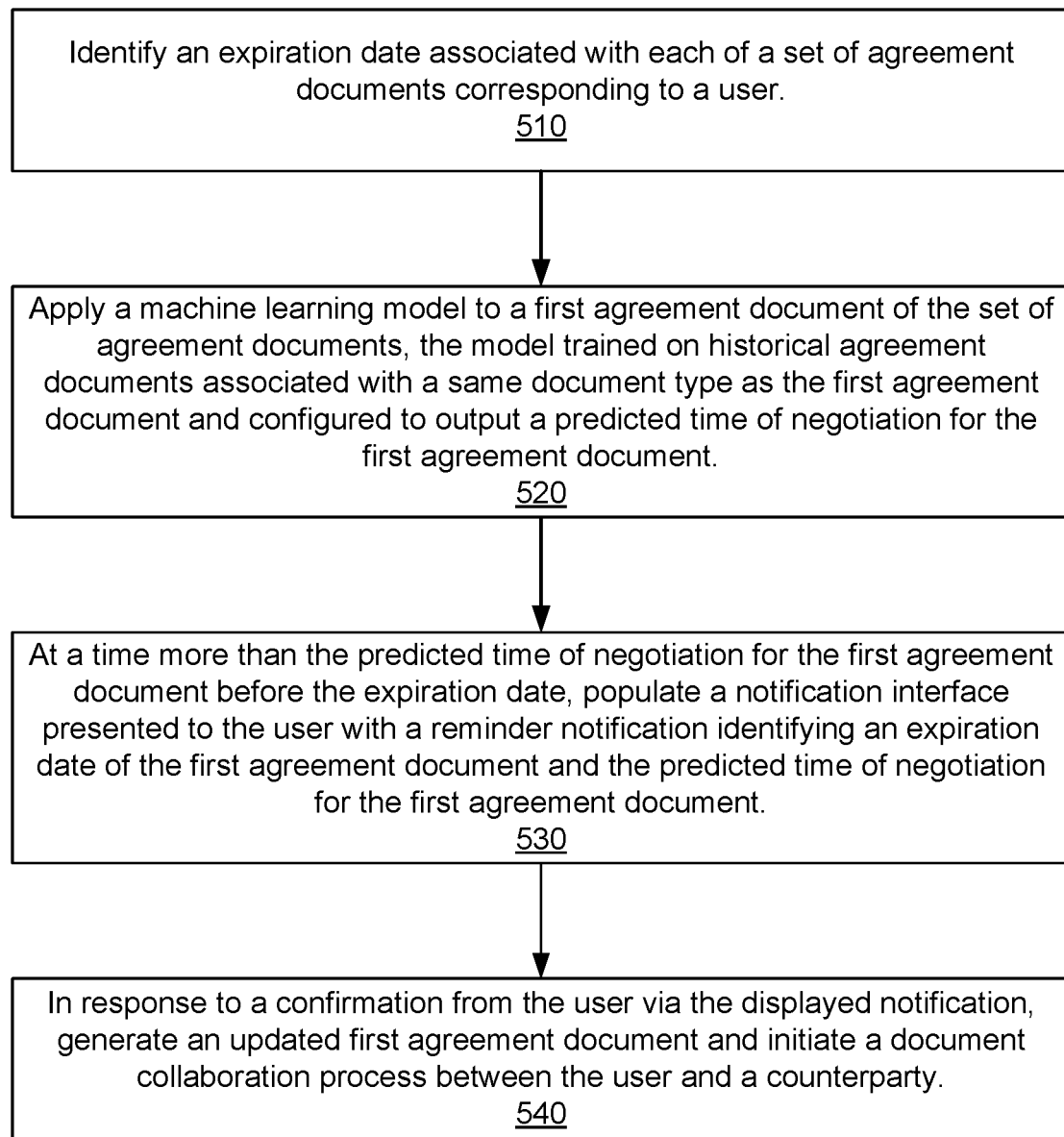
FIG. 5 illustrates an example process for identifying upcoming expiring agreement documents and predicting a length of time for re-negotiating the agreement, in accordance with an embodiment.

FIG. 5 illustrates an example process for identifying upcoming expiring agreement documents and predicting a length of time for re-negotiating the agreement, in accordance with an embodiment. In the embodiment shown in FIG. 5, the process is performed by the document management system 140. In other embodiments, some or all of the steps of the process may be performed by other components of the system environment or may be performed in a different order than that depicted in FIG. 5. Additionally, in other embodiments, the process illustrated in FIG. 5 can include fewer, additional, or different steps than those described herein.

The document management system 140 identifies 510 an expiration date associated with each of a set of agreement documents corresponding to a user. For example, the expiration identifier 230 may identify an expiration date associated with each of a user's agreement documents stored in the data store 205. The time prediction module 235 of the document management system 140 applies 520 a machine learning model, such as the negotiation prediction model 325, to a first agreement document of the set of agreement documents. The machine learning model is trained on historical agreement documents associated with a same document type as the first agreement document. The model is configured to output a predicted time of negotiation for the first agreement document. At a time more than the predicted time of negotiation for the first agreement document before the expiration date, the document management system 140 populates 530 a notification interface presented to the user, e.g., at a client device 120, with a reminder notification identifying an expiration date of the first agreement document and the predicted time of negotiation for the first agreement document. In response to a confirmation from the user via the displayed notification, the document generator 220 of the document management system 140 generates 540 an updated first agreement document and the collaboration module 240 of the document management system 140 initiates 540 a document collaboration process between the user and a counterparty. For example, the document may be sent to the counterparty for review and execution.

Clause Updates Based on Edits to Similar Clauses

The document management system 140 monitors standard clauses included by a user in documents and, when a clause is updated, flags other documents that include the clause. In this way, a user can be notified of other documents that the user may also want to update to include the language of the updated clause. If the difference between the instance of each clause in a flagged document and the updated clause language exceeds a threshold value, the documents may be presented to the user within an interface that enables the user to automate the process of updating the language of the outdated clause instances in the documents. Referring back to FIG. 2, a system for updating similar clauses includes the edit detector 245 and the document comparison module 250.

The edit detector 245 monitors changes made to documents to detect when clauses have been edited. In various embodiments, the edit detector 245 may detect changes to edits in different ways. In some cases, the document management system 140 may receive updated documents from a client device 120, such as documents for analysis 110. The edit detector 245 may compare a new version of a document received from the client device 120 with the same document already stored on the database 205 to determine if any edits have been made to clauses in the document. In one embodiment, a user of a client device 120 can make edits to a document by interacting directly with a document editing interface sent to the client device by the document review module 225. The edit detector 245 my detect when a change is made to the language of a clause through the document editing interface. In some embodiments, identifying an edit made by a user to the language of a clause includes detection of an edit made by the user to language to a clause within an agreement document that is being negotiated by the user during a negotiation process. An edited clause may include, but is not limited to, a name change of an entity listed in the clause, a change to a quantity or numerical amount within the clause, a change of jurisdiction or geographic location described in the clause, a change to a liability within the clause, a change to a date within the clause, a change to a proper noun within the clause, or a change to legal terminology within the clause.

The document comparison module 250 identifies a subset of documents stored in the database 205 that include an outdated instance of the updated clause. To identify the related documents, the document comparison module 250 queries the corpus of documents stored in the database 205 that are associated with the user. From this corpus of documents, the document comparison module 250 reviews the contents of the documents and identifies the related documents having the original instance of the clause (i.e., as it was before it was edited). The document comparison module 250 compares the edited clause with the original instance of the clause in the identified related documents and determines whether to include each of the related documents in a subset of documents that will be suggested to a user for editing to include the updated clause (i.e., a subset of the documents that include an outdated instance of the clause). In one embodiment, to determine the subset of documents, the document comparison module 250 identifies the subset of documents that include instances of the original clause that differ from the edited version of the clause by more than a threshold amount. As one example, a threshold of a difference of at least 10 characters may be required between the edited clause and the version of the original clause in another document for the other document to be included in the subset of related documents. Once the subset of documents is determined by the document comparison module 250, the document review module 225 can modify a document interface presented to the user at a client device 120 to include an interface element that identifies the edited clause and that also displays the identified subset of document that include the original, now outdated, clause. The user may interact with the document management system 140 via the interface presented by the document review module 225 to select one or more of the identified documents for replacement of the outdated clause with an instance of the updated clause, and the selected documents may be updated by the document generator 220.

Figure 6:
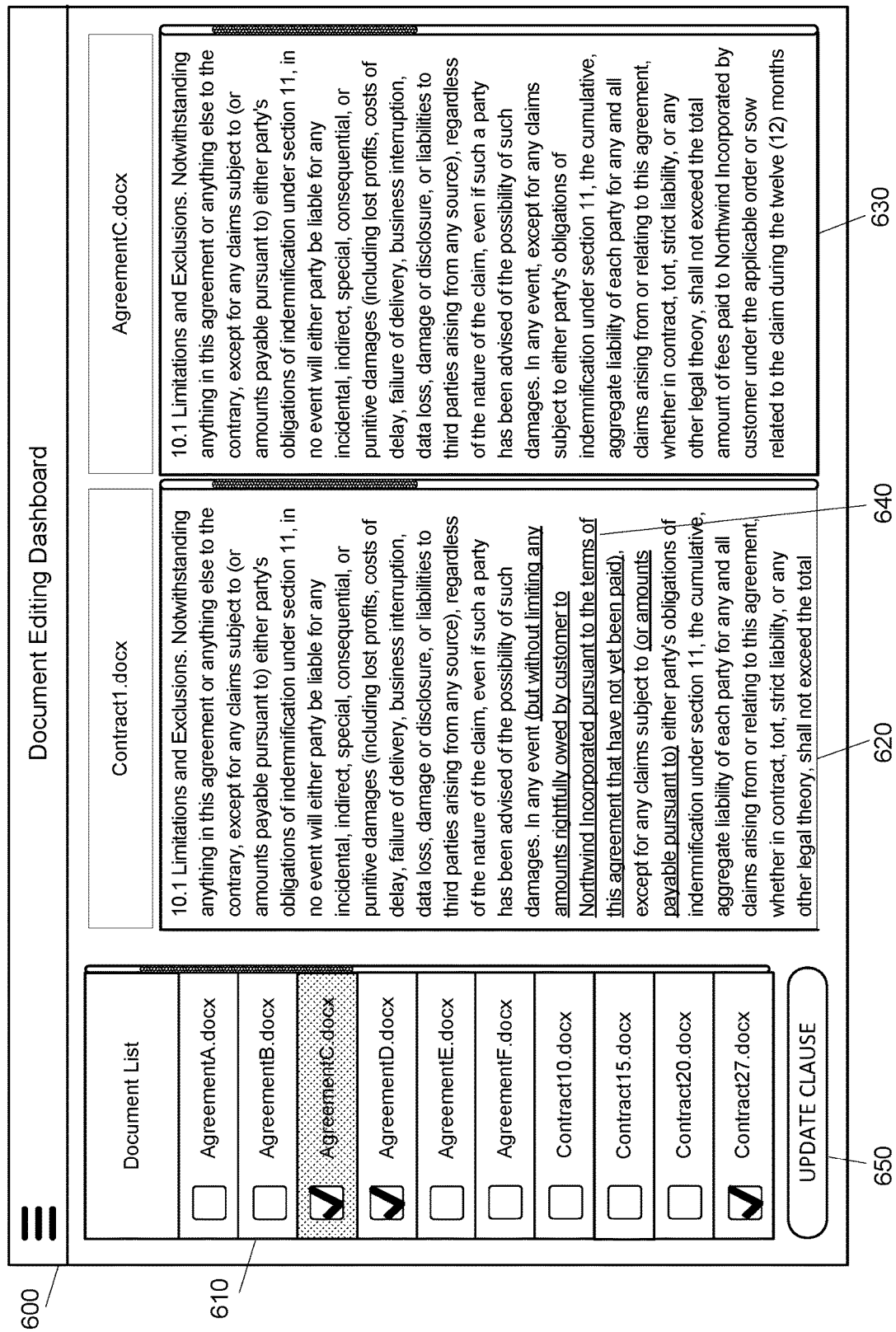
FIG. 6 illustrates an interface of a document editing dashboard for reviewing similar clauses across separate documents, in accordance with an example embodiment.

FIG. 6 illustrates an interface 600 of a document editing dashboard for reviewing similar clauses across separate documents, in accordance with an example embodiment. In the embodiment shown, the interface 600 includes a document list 610, a first interface area 620, a second interface area 630, markup indications 640, and a confirmation widget 650. The example interface 600 shows a document list 610 of documents that the document comparison module 250 identified as a subset of the documents associated with the user that include a clause that matches or nearly matches an edited clause in a document of the user. The example interface also includes a first interface area 620 that displays the edited clause and a second interface area 630 that displays a version of the original outdated clause in another document. In various embodiments, the first interface area 620 and/or the second interface area 630 includes markup 640 or another indication (e.g., highlighting) of the differences between the edited clause and the outdated original clause. In the example of FIG. 6, the first interface area 620 shows text from clause 10.1 of a document called Contract1.docx. The document list 610 lists documents that the document comparison module 250 has identified as having the same or a similar original clause (e.g., clause 10.1). In the example, document list 610, document AgreementC.docx is selected, as indicated by the dotted fill. Consequently, text from the related original clause in AgreementC.docx is displayed in the second interface area 630. The markup 640 in the first interface area 620 shows the edits that were made to the clause in Contract1.docx that make it differ from the original clause language which is still present in AgreementC.docx. In the example interface 600 of FIG. 6, a user can select among the documents in the document list 610 using checkmarks in check boxes to indicate one or more documents should be modified by the document generator 220 to include the updated clause language. To confirm the documents for modification, the user can select the confirmation widget 650. The components and functionalities of an interface 600 may be different in different embodiments.

Figure 7:
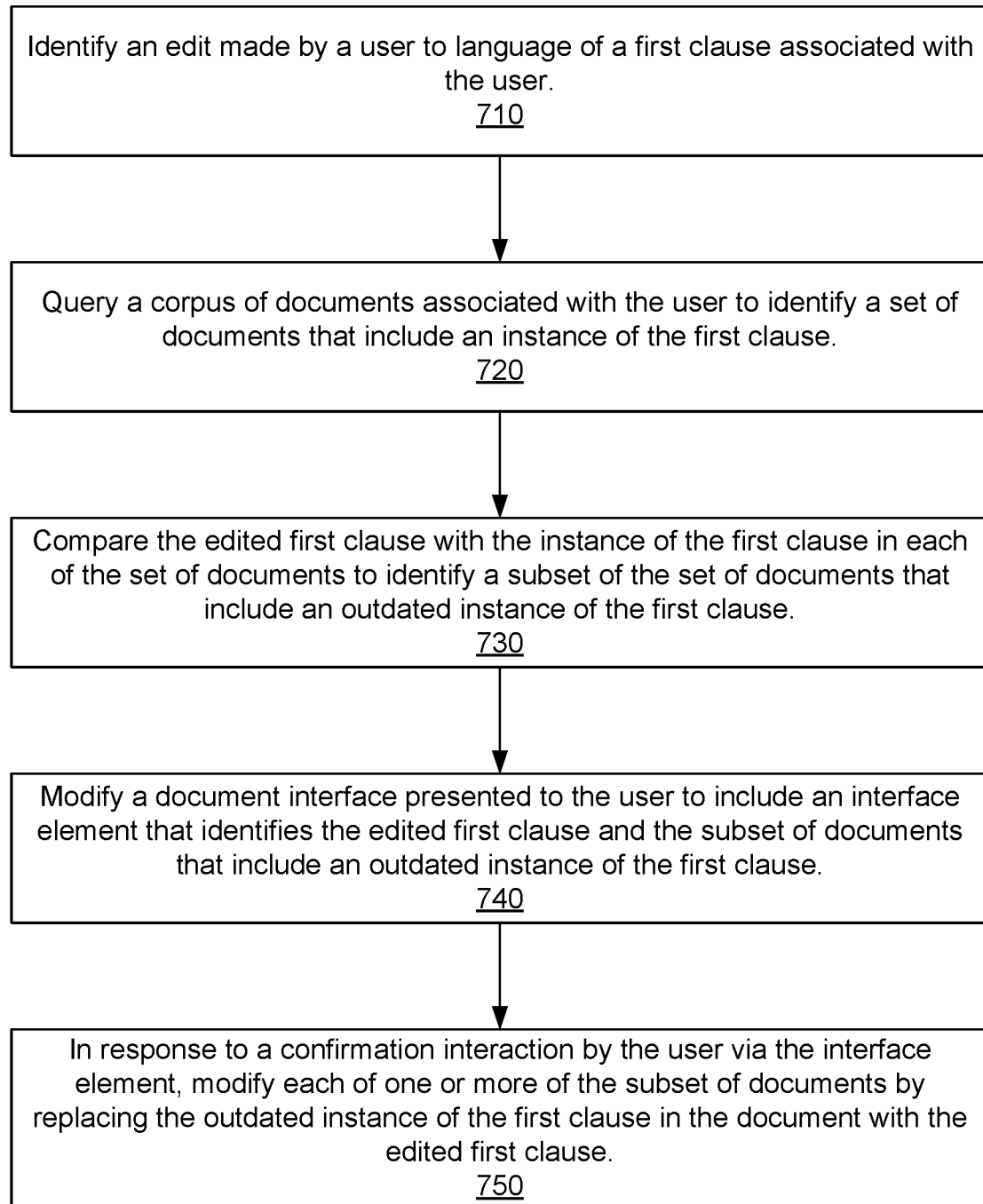
FIG. 7 illustrates an example process for flagging clauses in documents for updating when a similar clause is updated in another document, in accordance with an embodiment.

FIG. 7 illustrates an example process for flagging clauses in documents for updating when a similar clause is updated in another document, in accordance with an embodiment. In the embodiment shown in FIG. 7, the process is performed by the document management system 140. In other embodiments, some or all of the steps of the process may be performed by other components of the system environment or may be performed in a different order than that depicted in FIG. 7. Additionally, in other embodiments, the process illustrated in FIG. 7 can include fewer, additional, or different steps than those described herein.

When a user edits a document, the edit detector 245 of the document management system 140 identifies 710 an edit made by a user to language of a first clause associated with the user. The document comparison module 250 of the document management system 140 queries 720 a corpus of documents associated with the user to identify a set of documents that include an instance of the first clause. The document comparison module 250 compares 730 the edited first clause with the instance of the first clause in each of the set of documents to identify a subset of the set of documents that include an outdated instance of the first clause. Based on the identified subset of documents, the document review module 225 modifies 740 a document interface presented to the user to include an interface element that identifies the edited first clause and the subset of documents that include an outdated instance of the first clause. The user may interact with the modified interface to view the differences between the document clauses. In response to a confirmation interaction by the user via the interface element, the document generator 220 of the document management system 140 modifies 750 (e.g., edits) each of one or more of the subset of documents by replacing the outdated instance of the first clause in the document with the edited first clause. For example, each of the subset of documents that the user selected may be edited to include the updated clause language.

Machine-Learned Document Action Suggestions

The document management system 140 uses machine learning models to identify a type of document with which a user is interacting and to suggest actions that can be taken on the document. Examples of actions that may be taken with respect to a document include replacing text with fields, replacing clauses with pre-approved versions of the clauses, and synchronizing the document with a third-party system. Action options may be based on actions taken by similar users, actions done to similar documents, and actions taken in similar contexts (e.g., at similar times of the year). In one embodiment, the document management system 140 presents the recommended actions within an interface that enables a user to view and select desired actions from a list of suggested actions and that enables the user to automate the performance of the actions if requested. Referring back to FIG. 2, a system for suggesting document actions includes the document type predictor 255, the action store 260, and the action identifier 265.

The document type predictor 255 applies trained machine learning models to predict a type of document that a user is editing or otherwise interacting with. In one embodiment, the document type predictor 255 uses a document type prediction model 825, which takes in a document, a partial document, and/or a set of document features as input and outputs a predicted type of the document. The document type predictor 255 may analyze a document to determine a set of associated document features. In some embodiments, information about features associated with a document may additionally or alternately be stored as metadata in relation to the document at the database 205. Document features identified by the document management system 140 may include terms used within the document, clauses used within the document, images within the document, entities associated with the document, permissions associated with the document, actions taken on the document, templates used to generate the document, characteristics of the user, and characteristics of entities associated with a document. Additional information about the training and application of the document type prediction model 8125 is included in reference to FIG. 8 below. The document type prediction generated by the document type predictor 255 may be stored in the database 205 as metadata associated with the document. In some cases, the document type predictor 255 may analyze a document upon receipt of the document at the document management system 140 or the document type predictor 255 may update document type predictions by reanalyzing documents stored in the database 205 periodically or as additional training data is received to update the document type prediction model 825. In some embodiments, the document type predictor 255 analyzes a document or partial document to determine the type when the user is actively interacting with the document, for example, via an editing or review interface provided by the document review module 225. The document type prediction generated by the document type predictor 255 is provided to the action identifier for use in determining appropriate actions to suggest to a user with respect to the document.

The action store 260 stores information about actions that the document management system 140 can perform on documents. This may include possible actions that can be performed, as included, for example, in the action store by a system administrator or other user. Examples of actions that can be performed for a document include replacing text with fields, adding signature fields, replacing text with pre-approved versions of clauses, synchronizing the document with an external document system, changing a tense used in some or all sections of the document, populating fields with data from external data sources, and providing the document for review or signature to an entity associated with the document. The action store 260 may additionally store related information and metadata about possible actions. For example, the action store 260 may store information about which actions are performed on different document types, and how often certain actions are performed on different document types. Other metadata stored by the action store 260 could include common combinations of actions that have been taken by users on documents, a number of users that have performed certain action types, a number of times an action has been taken on documents, and characteristics of users that take perform certain actions with respect to a document type.

The action identifier 265 identifies a set of actions that can be taken on a document that user is currently editing or reviewing. The set of actions can then be suggested to the user via an interface presented at a client device 120 as generated by the document review module 225. The action identifier 265 identifies a set of actions that can be taken on the document by accessing the document type of the current document as predicted by the document type predictor 255. The action identifier 265 then accesses the action store 260 to obtain a set of actions that have been taken or can be taken on documents of the same type. In some embodiments, actions taken on other documents of the document type include actions taken by the same user on other documents of the document type or actions taken by users with one or more characteristics in common with the user. In some embodiments, actions taken on other documents of the document type include actions taken in the past by at least a threshold number of users or actions that have been implemented at least a threshold number of times on other documents of the document type.

Figure 8:
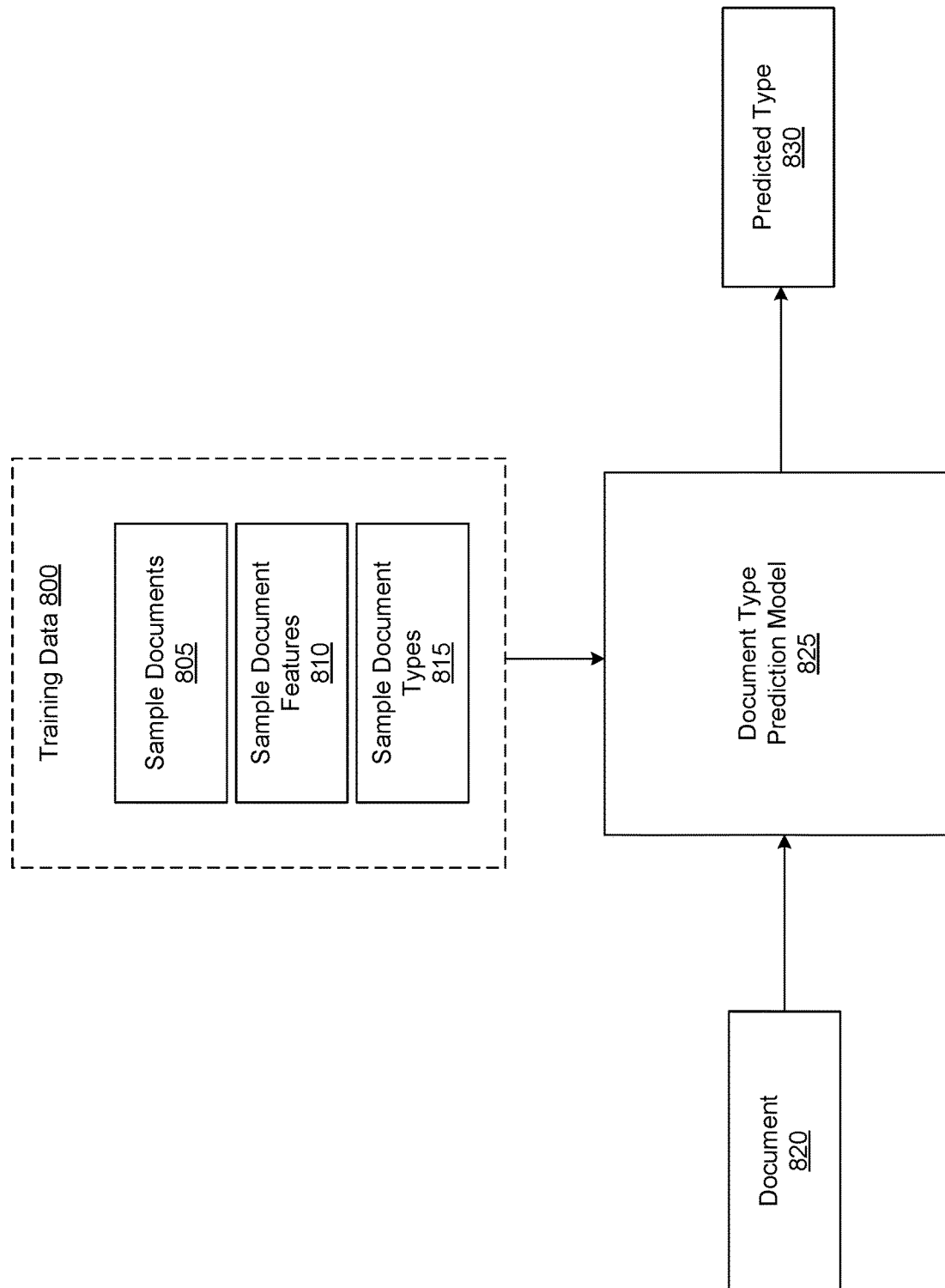
FIG. 8 is a flow diagram illustrating training and application processes for a document type prediction model, in accordance with an example embodiment.

FIG. 8 is a flow diagram illustrating training and application processes for a document type prediction model 825, in accordance with an example embodiment. The document type prediction model 825 takes, as input, a document 820 (or a partial document or list of document features associated with the document 820), and outputs a predicted type of the document. The document type prediction model 825 is trained to predict a type of a document using information about sample documents, document features and document types.

The model generator 210 trains the document type prediction model 825 using a set of training data 800. In some cases, multiple document type prediction models 825 may be trained and stored in the model store 215 for use by the document type predictor 255. For example, the model store 215 may store a separate document type prediction model 825 in association with each individual user or in association with separate entities using the document management system 140. The document type prediction model 825 is trained to identify correlations between document types and document features and the document type of a document may be determined based on an input set of document features using the identified correlations. The training data 800 may include sample documents 805, sample document features 810, and sample document types 815. In various embodiments, the training data 800 may include additional or different training inputs not shown in FIG. 8.

The training data 800 may be provided via client device 120 to the document management system 140. In other embodiments, the document management system 140 may automatically collect the sample documents 805, the sample document features 810, and the sample document types 815 to add to the training data 800 as it processes documents. In other embodiments, a user of a client device 120 associated with the document management system 140 (e.g., a system administrator) may manually input or curate a subset of the training data 800. It should be noted that the training data 800 may include historical document data and/or sample documents that are generated and labeled for the purpose of training the document type prediction model 825.

Sample documents 805 used as a subset of the training data 800 may include the text of documents and metadata associated with the documents. The training set of sample documents 805 may include documents associated with a particular user, documents associated with an entity or with another user associated with the user, or documents associated with users having one or more characteristics in common with the user. For example, if the model generator 210 trains a model for each user, then it may use documents associated with similar users for training. In addition to the text and input fields present in a document, the metadata stored in association with a sample document may include document file type, file size, languages within the document, region in which the document originated, characteristics associated with the sending and receiving party of the document (e.g., size, industry, location of headquarters, revenue, corporate structure), types or categories of information or passages within the document, and the like.

The sample document features 810 used for training the machine learning models may include descriptions of document features or may include annotations of sample documents 805 as having certain document features. Document features 810 may include specific terms used within a document, clauses within a document, images within a document, entities associated with a document, permissions associated with the document, actions taken on a document in the past, templates used to generate a document, characteristics of a user associated with the document, characteristics of entities associated with a document, a word count, the presence of signature lines, and specific data collection fields included in the document, among other items.

The sample document types 815 include annotations to the sample documents 805 and to the sample document features 810 that indicate the type of document with which the documents or features can be associated. For example, this may include a document type label associated with a sample document 805. In some cases, training information about document types may be input manually by a user of a client device 120 associated with the document or by a system administrator.

The model generator 210 uses supervised or unsupervised machine learning to train the document type prediction models 825 using the training data 800. Different machine learning techniques may be used in various embodiments, such as linear support vector machines (linear SVM), boosting for other algorithms (e.g., AdaBoost), neural networks, logistic regression, naïve Bayes, memory-based learning, random forests, bagged trees, decision trees, boosted trees, or boosted stumps. The training of a document type prediction model 825 helps the model to identify correlations between document features and document types. That is, training a document type prediction model 825 enables the document type prediction model 825 to identify a predicted type 830 of a document 820. In some embodiments, the model generator 210 trains multiple document type prediction models 825, such as a separate document type prediction model 825 for each user or for each entity associated with the document management system.

A trained document type prediction model 825 can be applied by the document type predictor 255 to a document 820. In some embodiments, the document type prediction model 825 also or alternately accepts metadata associated with the document (e.g., document features) as input. The document type prediction model 825 generates a predicted type 830 of the document 820. The action identifier 265 can use a predicted document type 830 to select actions that are likely to be relevant to the document 820 from the action store 260. The document review module 225 may display the selected actions for a user of a client device 120 to view and select so that the action can be taken for the document.

FIG. 9 illustrates an interface 900 of a document editing dashboard for viewing and selecting suggested actions related to a document, in accordance with an example embodiment. In the embodiment shown, the interface 900 includes an action list 910, and action confirmation widgets 920. The example interface 900 also displays a view of the document (e.g., Contract1.docx) that the user is currently reviewing or editing. The action list 910 has been modified by the document review module 225 to present actions selected by the action identifier 265 as being available actions to perform on the document. The user can confirm which, if any, of the actions for the document management system 140 to take with respect to the document by selecting one or more of the action confirmation widgets 920. An action confirmation widget 920 may be a button, a drop-down menu, an input field, or another user input component of the interface 900. In response to a user selecting one or more of the actions via the interface 900, the document management system 140 performs the selected actions on the document.

Figure 10:
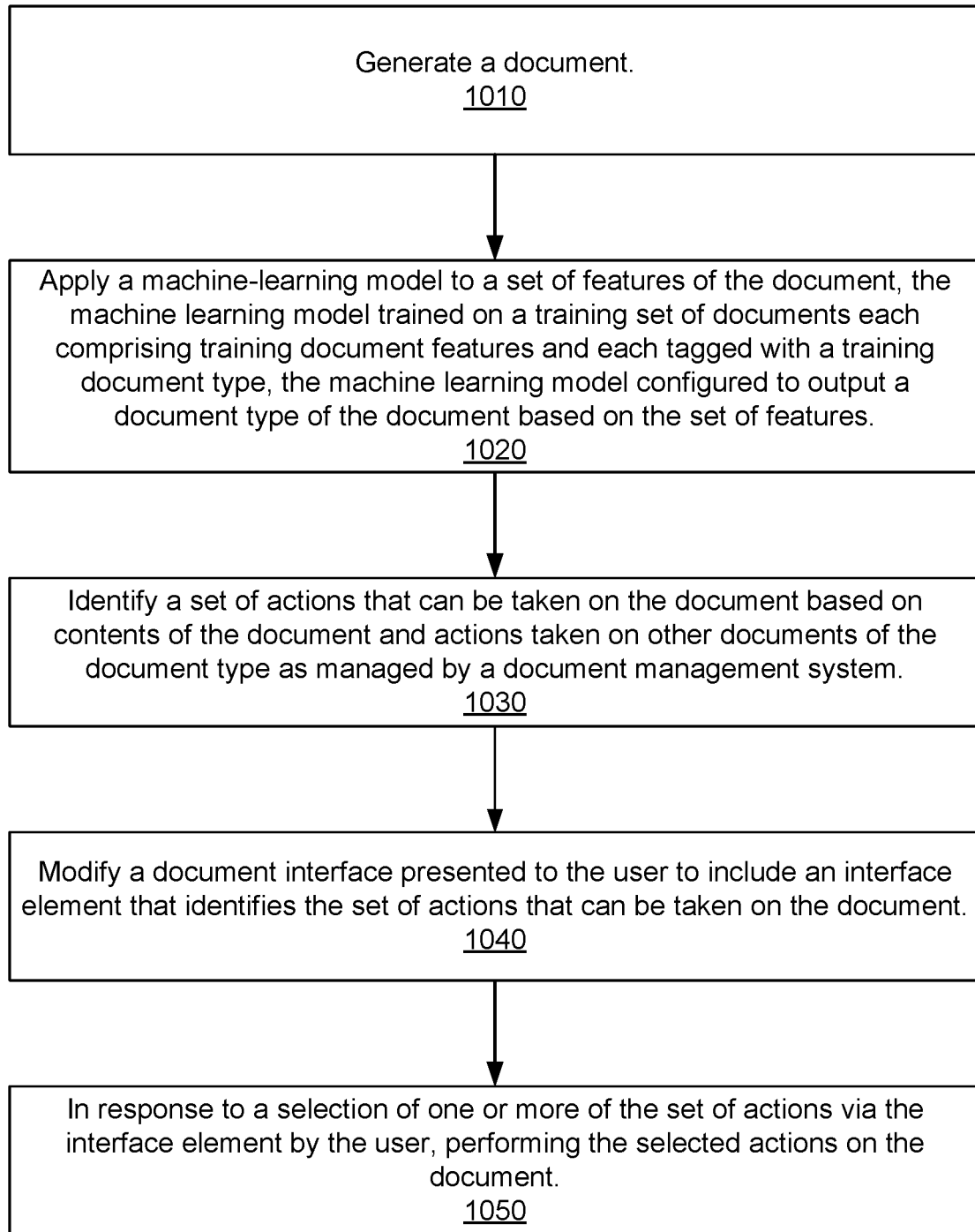
FIG. 10 illustrates an example process for identifying actions that a user can request for a document, in accordance with an embodiment.

FIG. 10 illustrates an example process for identifying actions that a user can request for a document, in accordance with an embodiment. In the embodiment shown in FIG. 10, the process is performed by the document management system 140. In other embodiments, some or all of the steps of the process may be performed by other components of the system environment, or may be performed in a different order than that depicted in FIG. 10. Additionally, in other embodiments, the process illustrated in FIG. 10 can include fewer, additional, or different steps than those described herein. When a user is interacts with a document, for example to edit or review the document, the document management system 140 can suggest actions related to the document. The document type predictor 255 of the document management system 140 applies 1020 a machine-learning model to a set of features of the document. The machine learning model may be a document type prediction model 825 that is trained on a training set of documents. Each of the documents in the training set of documents may include information about training document features and may be tagged or labeled with a training document type. The trained machine learning model is configured to output a document type of the document based on the set of features associated with the given document. Based on the document type output by the machine learning model for the document, the action identifier 265 of the document management system 140 accesses an action store 260 and identifies 1030 a set of actions that can be taken on the document based on the contents of the document and actions taken on other documents of the same predicted document type. The document review module 225 of the document management system 140 modifies 1040 a document interface presented to the user at a client device 120 to include an interface element that identifies the set of actions that can be taken on the document. The user may then choose to confirm via the interface that the displayed actions should be taken on the document. In response to a selection of one or more of the set of actions via the interface element by the user, the document management system 140 performs 1050 the selected actions on the document.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying, by a document management system, an edit made by a user to language of a first clause associated with the user;
    querying, by the document management system, a corpus of documents associated with the user to identify a set of documents that include an instance of the first clause;
    comparing, by the document management system, the edited first clause with the instance of the first clause in each of the set of documents to identify a subset of the set of documents that include an outdated instance of the first clause;
    modifying, by the document management system, a document interface presented to the user to include 1) a first interface portion listing the identified subset of documents and configured to enable the user to select a document of the identified set of documents, 2) a second interface portion that displays the edited first clause, and 3) a third interface portion that displays an outdated instance of the first clause within a selected document that is selected from the identified subset of documents using the first interface portion; and
    in response to a confirmation interaction by the user via the interface element, modifying, by the document management system, each of one or more of the subset of documents by replacing the outdated instance of the first clause in the document with the edited first clause.

2. The method of claim 1, wherein identifying an edit made by the user to the language of the first clause comprises detecting an edit made by the user to language within an agreement document being negotiated by the user corresponding to the first clause during a negotiation process.

3. The method of claim 1, wherein the identifying subset of documents comprise documents that include instances of the first clause that differ from the edited first clause by more than a threshold amount.

4. The method of claim 1, wherein the edited first clause includes a change to a name of an entity within the first clause, a change to a quantity or numerical amount within the first clause, a change of jurisdiction or geographic location within the first clause, a change to a liability within the first clause, a change to a date within the first clause, a change to a proper noun within the first clause, or a change to legal terminology within the first clause.

5. The method of claim 1, wherein one of the first interface portion or the second interface portion includes highlighting or markup indicating one or more differences between the edited first clause and the outdated instance of the first clause.

6. The method of claim 1, wherein the confirmation interaction by the user comprises a selection of the one or more of the subset of documents to modify.

7. A non-transitory computer-readable storage medium storing executable instructions that, when executed by a hardware processor, cause the hardware processor to perform steps comprising:
    identifying, by a document management system, an edit made by a user to language of a first clause associated with the user;

querying, by the document management system, a corpus of documents associated with the user to identify a set of documents that include an instance of the first clause;

comparing, by the document management system, the edited first clause with the instance of the first clause in each of the set of documents to identify a subset of the set of documents that include an outdated instance of the first clause;

modifying, by the document management system, a document interface presented to the user to include 1) a first interface portion listing the identified set of documents and configured to enable the user to select a document of the identified subset of documents, 2) a second interface portion that displays the edited first clause, and 3) a third interface portion that displays an outdated instance of the first clause within a selected document that is selected from the identified subset of documents using the first interface portion; and in response to a confirmation interaction by the user via the interface element, modifying, by the document management system, each of one or more of the subset of documents by replacing the outdated instance of the first clause in the document with the edited first clause.

8. The non-transitory computer-readable storage medium of claim 7, wherein identifying an edit made by the user to the language of the first clause comprises detecting an edit made by the user to language within an agreement document being negotiated by the user corresponding to the first clause during a negotiation process.

9. The non-transitory computer-readable storage medium of claim 7, wherein the identifying subset of documents comprise documents that include instances of the first clause that differ from the edited first clause by more than a threshold amount.

10. The non-transitory computer-readable storage medium of claim 7, wherein the edited first clause includes a change to a name of an entity within the first clause, a change to a quantity or numerical amount within the first clause, a change of jurisdiction or geographic location within the first clause, a change to a liability within the first clause, a change to a date within the first clause, a change to a proper noun within the first clause, or a change to legal terminology within the first clause.

11. The non-transitory computer-readable storage medium of claim 7, wherein one of the first interface portion or the second interface portion includes highlighting or markup indicating one or more differences between the edited first clause and the outdated instance of the first clause.

12. The non-transitory computer-readable storage medium of claim 7, wherein the confirmation interaction by the user comprises a selection of the one or more of the subset of documents to modify.

13. A document management system comprising:
a hardware processor; and
a non-transitory computer-readable storage medium storing executable instructions that, when executed, cause the hardware processor to perform steps comprising:

identifying, by the document management system, an edit made by a user to language of a first clause associated with the user;

querying, by the document management system, a corpus of documents associated with the user to identify a set of documents that include an instance of the first clause;

comparing, by the document management system, the edited first clause with the instance of the first clause in each of the set of documents to identify a subset of the set of documents that include an outdated instance of the first clause;

modifying, by the document management system, a document interface presented to the user to include 1) a first interface portion listing the identified subset of documents and configured to enable the user to select a document of the identified subset of documents, 2) a second interface portion that displays the edited first clause, and 3) a third interface portion that displays an outdated instance of the first clause within a selected document that is selected from the identified subset of documents using the first interface portion; and in response to a confirmation interaction by the user via the interface element, modifying, by the document management system, each of one or more of the subset of documents by replacing the outdated instance of the first clause in the document with the edited first clause.

14. The document management system of claim 13, wherein identifying an edit made by the user to the language of the first clause comprises detecting an edit made by the user to language within an agreement document being negotiated by the user corresponding to the first clause during a negotiation process.

15. The document management system of claim 13, wherein the identifying subset of documents comprise documents that include instances of the first clause that differ from the edited first clause by more than a threshold amount.

16. The document management system of claim 13, wherein the edited first clause includes a change to a name of an entity within the first clause, a change to a quantity or numerical amount within the first clause, a change of jurisdiction or geographic location within the first clause, a change to a liability within the first clause, a change to a date within the first clause, a change to a proper noun within the first clause, or a change to legal terminology within the first clause.

17. The document management system of claim 13, wherein one of the first interface portion or the second interface portion includes highlighting or markup indicating one or more differences between the edited first clause and the outdated instance of the first clause.

* * * * *